United States Patent [19]

Gunawardena

[11] 4,212,058
[45] Jul. 8, 1980

[54] COMPUTER STORE MECHANISM

[75] Inventor: Jaya A. Gunawardena, Peradeniya, Sri Lanka

[73] Assignee: National Research Development Corporation, London, England

[21] Appl. No.: 834,872

[22] Filed: Sep. 20, 1977

Related U.S. Application Data

[63] Continuation-in-part of Ser. No. 726,162, Sep. 24, 1976, abandoned.

[30] Foreign Application Priority Data

Sep. 27, 1975 [GB] United Kingdom ............... 39647/75

[51] Int. Cl.² .......................... G11C 9/00; G06F 13/00
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,675,217 | 7/1972 | Dauber et al. | 364/200 |
| 3,676,857 | 7/1972 | Jackson | 364/200 |
| 3,693,165 | 9/1978 | Reiley et al. | 364/200 |

*Primary Examiner*—Gareth D. Shaw
*Assistant Examiner*—C. T. Bartz
*Attorney, Agent, or Firm*—Cushman, Darby & Cushman

[57] ABSTRACT

In a computer system having two levels of memory, a random access memory is used as a slave store for both code and directly addressed data. Each slave store word includes two slave address fields, one for the slave address of an operand and the other for the slave address of the next instruction. Validation means are provided to determine whether the word at such a slave address has been overwritten since the slave address was recorded.

13 Claims, 10 Drawing Figures

| OPCODE | OPERAND MAIN ADDRESS | HOME ADDRESS | S. | S. |
|---|---|---|---|---|

SLAVE ADDRESS OVERFLOW. OPERAND TAG≠SLAVE ADDRESS OVERFLOW.

SLAVE STORE LOCATION S.

NEXT INSTRUCTION TAG≠SLAVE ADDRESS OVERFLOW.

FIG. 9.

| OPCODE | OPERAND MAIN ADDRESS | HOME ADDRESS | OPERAND SLAVE ADDRESS | NEXT INSTRUCTION SLAVE ADDRESS |
|---|---|---|---|---|

SLAVE ADDRESS OVERFLOW. OPERAND TAG. NEXT INSTRUCTION TAG.

COMPUTER STORE MECHANISM

This application is a continuation-in-part of Ser. No. 726,162 filed Sept. 24, 1976 (now abandoned).

FIELD OF THE INVENTION

This invention relates to computer store mechanisms and more particularly to a method and apparatus for accessing data and code information in a computer with at least two levels of memory. One of the two levels of memory comprises a relatively slow store and will hereinafter be referred to as the main store. The other comprises a relatively fast store and will hereinafter be referred to as the slave store.

BACKGROUND OF THE INVENTION

In a known mechanism, each word of the slave store comprises a field of equal size to a main store word and a so-called home address field of sufficient size to contain a main store address. As each word is transferred from the main store to the slave store, its address in the main store is written into the corresponding home address field. When an item of information is required, the home address fields of the slave store are associatively searched for the main store address of the required item. If a match is found, the required item of information is obtained from the slave store. If no match is found, the required item is transferred from the main store to the slave store, a previously entered word being first discarded from the slave store to make room for the word to be entered if necessary. The record of the information in the main store is left undisturbed.

In another known system, the use of an associative store is avoided by transferring only instructions to a slave store which is organised as a stack. In a further known mechanism, in which both data and instructions are transferred to a slave store which does not use associative addressing, a field of low order bits from the main address determines the slave store location to which information may be transferred. This restriction can cause information to be discarded from the slave store while the latter is only partially full.

SUMMARY OF THE INVENTION

It is an object of the present invention to provide a slave store mechanism which enables both instructions and data to be entered in the slave store while avoiding both associative searching and discarding information from the slave store before the slave store is full.

According to the invention in one aspect, there is provided a computer system comprising a processor, a main store, a slave store in which each word includes a main field of the same size as a word of the main store and at least one slave address field for a slave address, a storage access controller connecting said processor to said main store and said slave store and including a discard address register for determining the location into which the next entry in the slave store is to be made, and validation means for determining whether the word at said slave address has been overwritten since said slave address was written into said slave address field.

Preferably, each word of the slave store has two slave address fields, one for the slave address of an operand and the other for the slave address of a next instruction.

According to the invention in another aspect, there is provided a method of accessing information in a computer with two levels of memory, one level comprising a main store and the other level comprising a slave store in which each word includes a main field of the same size as a word of the main store and at least one field for a slave address, there being provided a discard address register for determining the location into which the next entry in the slave store is to be made, the method comprising entering a plurality of items of information into respective words of the slave store, at least one of said items of information being an instruction, entering the slave address of an item of information required by said instruction into the slave address field thereof and performing a validation test prior to execution of said instruction to determine whether the word at said slave address has been overwritten since said slave address was entered into said slave address field.

The invention is also concerned with the provision of a computer programme embodied in a record medium and comprising instructions for carrying out the above method.

In one form of the invention, the capacity of the discard address register is one bit greater than the number of bits of each slave store address, a tag field of one bit is associated with said slave address field and the storage access controller is arranged to copy the most significant bit in the discard address register into the associated tag field when a slave address is written into the slave address field of a word in the slave store, the validation means being arranged to compare said tag field with the value of the most significant bit in the discard address register at the time when the information stored in the main field at the slave address recorded in said slave address field was entered at said slave address.

One way of ascertaining the value of the most significant bit of the discard address register at the time when information was entered at a slave address is to provide each slave store word with a slave address overflow field and to arrange for the storage access controller to copy the most significant bit in the discard address register into the slave address overflow of a word of the slave address store when an item of information is written therein.

In use, information, which may be an instruction or data, is transferred to the slave store only when required by the processor. If a branch instruction is executed, only those instructions in the path taken are transferred to the slave store. Information is discarded from the slave store on a "first in-first out" basis and all discarded information is copied back into the main store.

In the slave store, instructions are augmented by the additional slave address field enabling the processor to operate in a (1+1) address mode, accessing the slave store only.

DESCRIPTION OF THE PREFERRED EMBODIMENT

It should be noted that, in the following description, addresses are placed within parentheses "( )".

Figure 1:
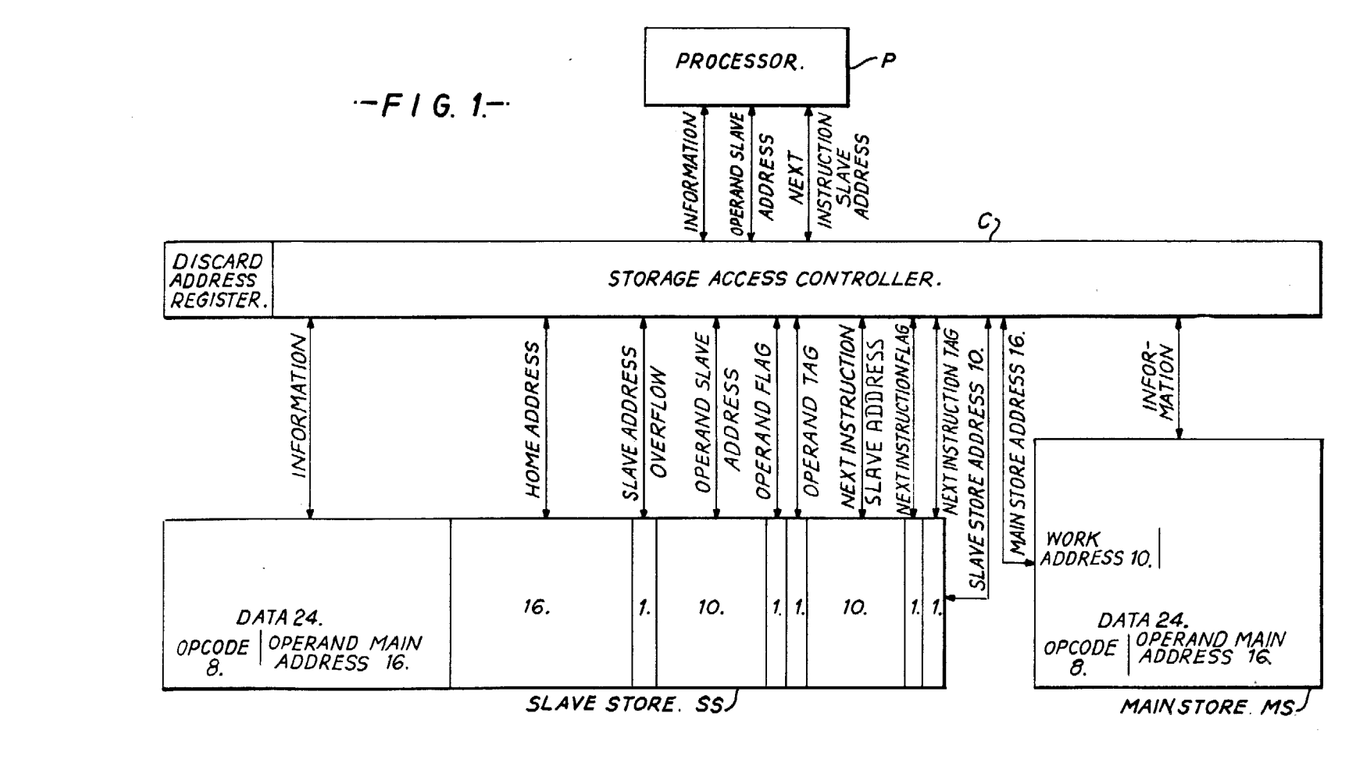
FIG. 1 is a block diagram illustrating a slave store mechanism in accordance with the invention.

FIG. 1 shows part of a computer system embodying the invention and comprising a processor P, a slave store SS and a main store MS interconnected by a storage access controller C. Each main store word is 24 bits long and normally comprises either a 24 bit data field or an 8 bit opcode field and a 16 bit operand main address field. Each main store address consists of 16 bits.

Each slave store address consists of 10 bits. Each slave word is 65 bits long consisting of a 24 bit information field, a 16 bit home address field, a 1 bit slave address overflow field, a 10 bit operand slave address field, a 1 bit operand flag, a 1 bit operand tab, a 10 bit next instruction slave address field, a 1 bit next instruction flag and a 1 bit next instruction tag. The information field is used to store a word transferred from the main store MS and the rest of each slave store word is used in the processing of the information transferred from the main store MS as will be explained hereinafter.

The storage access controller C includes a so-called discard address register of 11 bits. The 10 least significant bits contain the current discard address which is the address of the slave store location from which an item of information is to be discarded next in order to accommodate a new item of information from the main store. After each discard and entry, the discard address register is incremented by one so that discarding and entry proceeds in a cyclic manner with wraparound of the slave store addresses.

The most significant bit of the discard address register changes at the end of each cycle of discarding and entry and thus differs in alternate cycles. This bit will hereinafter be referred to as the enslave address overflow bit.

Transfer of information between the main store MS and slave store SS is effected by the procedure ENSLAVE (argument) which discards information from the slave store SS at the current discard address, transfering it back to its original location in the main store MS, and transfers the contents of the main store MS at the address given by the argument to the slave store location indicated by the current discard address. This procedure also sets up the linkages shown in FIG. 2 so that the address of the main store location from which the information was transferred is entered in the home address field at the slave store location and the slave store address into which the information has been transferred is set up in first 10 bits of the main store location from which it was transferred, these first 10 bits constituting a work address field. Further, the enslave address overflow bit in the discard address register is copied into the slave address overflow field at the slave store location. The operand flag bit and the next instruction flag bit are each set to "not ready".

The processor will enslave additional information as and when necessary. Since, during the first cycle of slave store addresses, spurious discards will be made, location zero of the main store is not used to store information and it is arranged by the following procedure that all such spurious discards are made to location zero of the main store, clear all home address fields;
clear discard address register;
ENSLAVE (origin);
increment discard address register;
pass control to slave store (O);

This need be carried out only once after power up.

During operation, prior to execution of an instruction, the slave addresses of the operand and the next instruction must be entered in the appropriate fields of the current instruction slave store word. The operand flag and next instruction flag of each word are used to indicate whether a slave address has been entered in the corresponding slave address field since the instruction in such word was enslaved. The following procedure is used to detect whether an item of information is in the main store or the slave store;

access main store at the required main store address;
obtain contents of work address field;
get home address from slave store (work address);
compare with required main store address.

Figure 2:
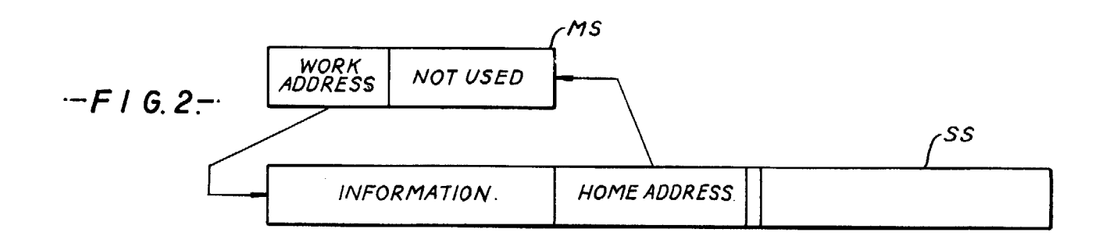
FIGS. 2 to 6 are block diagrams of individual words of the main and slave stores of the embodiment shown in FIG. 1 illustrating linkages established at various stages in the procedure.
Figure 5:
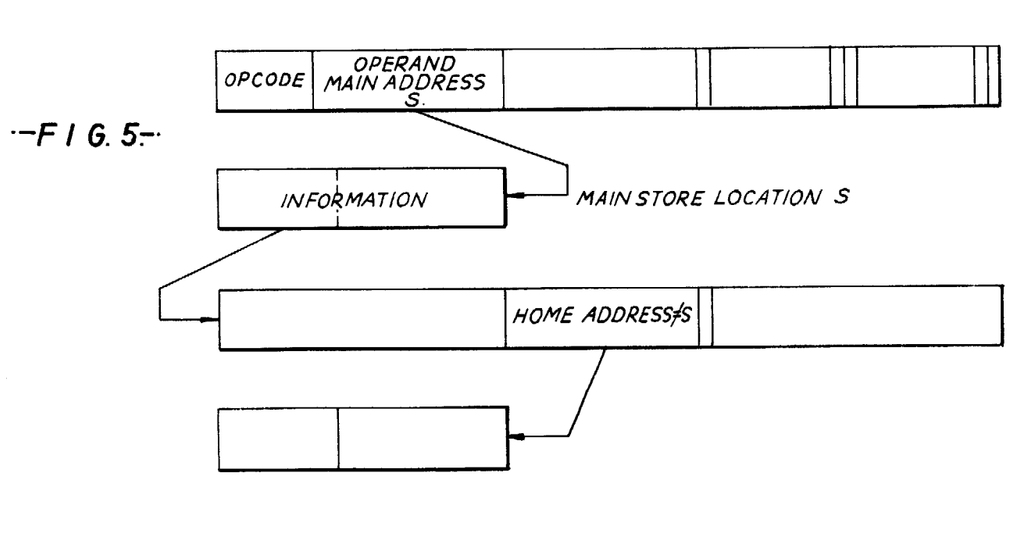

If the two addresses are equal, the main store contains a work address (see FIG. 2). If the two addresses are not equal, the main store contains information (see FIG. 5), and a 10 bit field forming part of the information has been erroneously interpreted as a work address.

Figure 3:
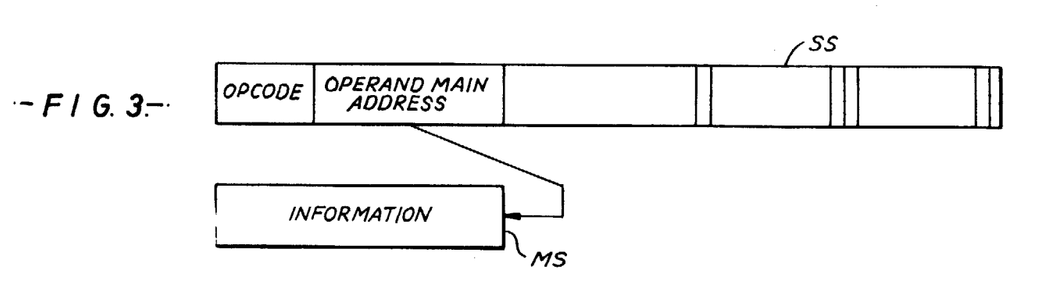

The operand may be in the main store and the operand flag therefore in its "not ready" state. In this case, the following procedure is used:

ENSLAVE (Operand main address); —see FIG. 3
set operand slave address to discard address;
set operand flag to ready;
increment discard address register.

Figure 4:
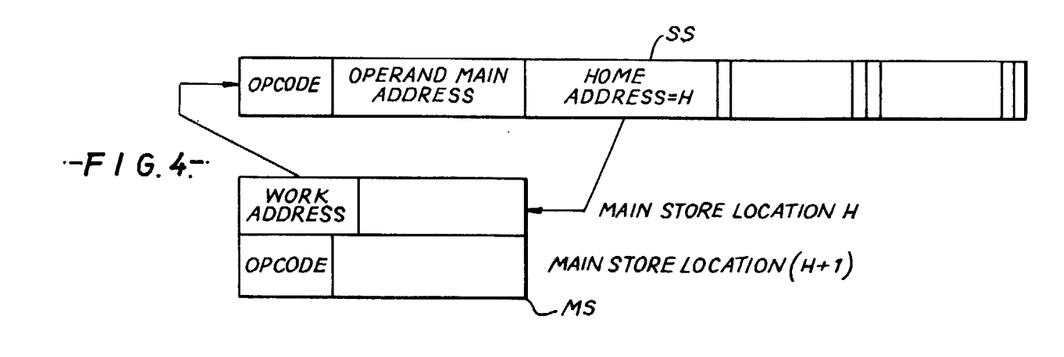

If the operand has been enslaved by an instruction executed earlier it may be in the slave store while the operand flag of the current instruction is in the "not ready" state. In this case the following procedure is used:

get work address of operand from main store; —see FIGS. 2 and 3
set operand slave address to work address of operand;
set operand flag to ready Similarly the next instruction may be in the main store, in which case, the next instruction flag will be "not ready". The following procedure is used;

ENSLAVE (home address of current instruction +1); —see FIG. 4
set next instruction slave address to discard address;
set next instruction flag to ready;
increment discard address register;

If the next instruction has been enslaved by an instruction executed earlier it may be in the slave store while the next instruction flag of the current instruction is in the "not ready" state. In this case the following procedure is used:

get work address of next instruction from main store; —see FIGS. 2 and 4
set next instruction slave address to work address of next instruction;
set next instruction flag to ready.

Figure 6:
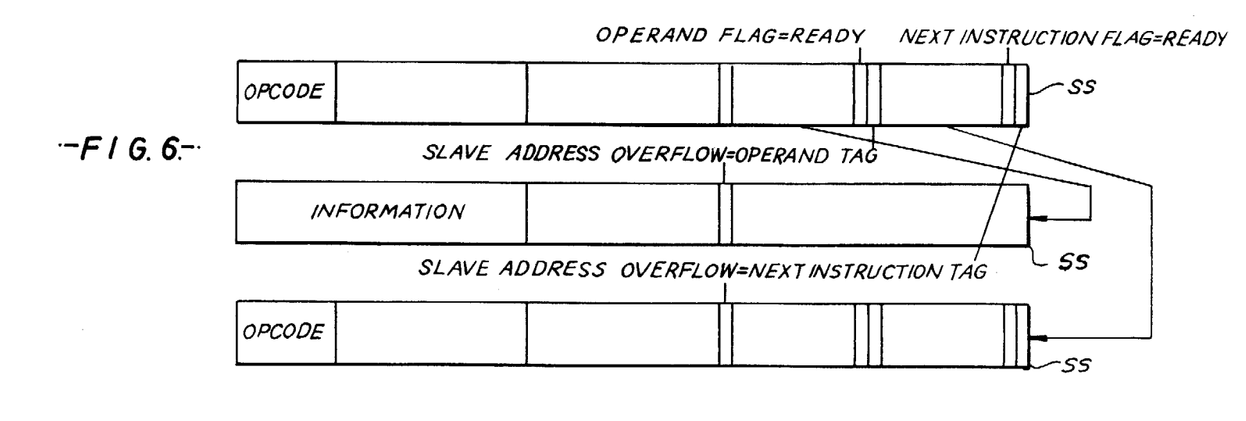

After an instruction has been executed, the linkages are as shown in FIG. 6, each slave addresses remaining valid until the items to which it points is discarded. Consequently, if the programme is a loop, execution thereof can be repeated without access to the main store until one of the items concerned is discarded.

When an operand is discarded, all slave addresses pointing to that operand become invalid. The following procedure enables an invalid operand slave address to be detected.

When an operand is enslaved, the current value of the enslave address overflow bit of the discard address register is placed in the slave address overflow field of the slave store location to which the operand is being transferred. When an instruction in the slave store is augmented by writing a slave address into its operand slave address field, the slave address overflow bit of the operand is placed in the operand tag field of the instruction.

On accessing an operand in the slave store for execution, its slave address overflow bit is compared with the operand tag of the instruction. In accordance with the invention, if the operand has been discarded, the two bits will be unequal.

This rule is valid for the following reasons. An operand is discarded only after one pass of the discard address through all locations of the slave store. When the discard address register is incremented from a discard address of 1023 (the highest numbered address of the slave store), the enslave address overflow bit changes. Thus, the new value of the slave address overflow bit will not be equal to the old value. Since no location in the slave store can be overwritten twice without overwriting every instruction linked to it, there is no possibility of an instruction remaining in the slave store when the enslave address overflow bit has changed twice. When a slave address is detected as being invalid, a new slave address is generated by locating the operand elsewhere in the slave store if it has already been re-enslaved or by getting the required operand from the main store.

Discarded next instructions may be detected in a similar manner.

Figure 7:
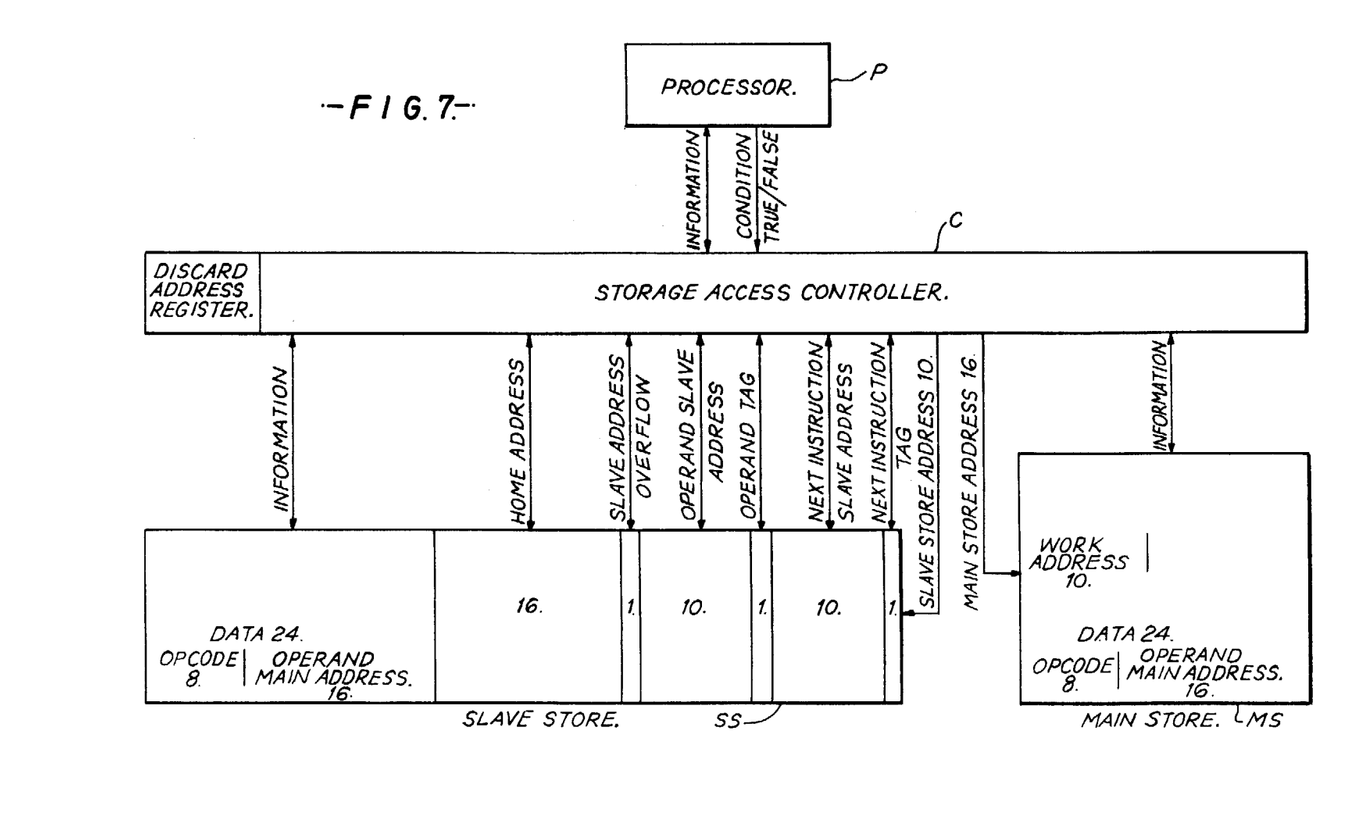
FIG. 7 is a block diagram of another embodiment of the invention.
Figure 8:
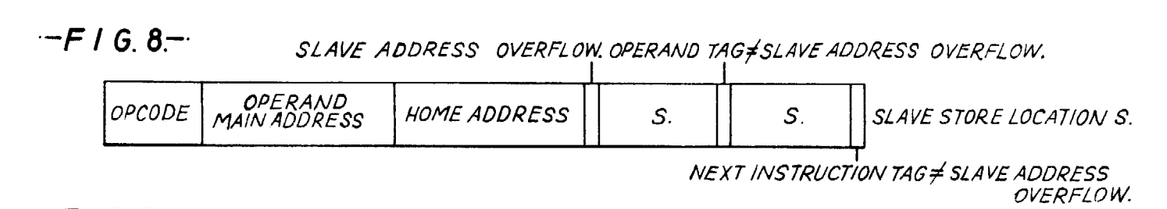
FIGS. 8 and 9 are block diagrams similar to FIGS. 2 to 6, illustrating the operation of the embodiment shown in FIG. 7.
Figure 9:
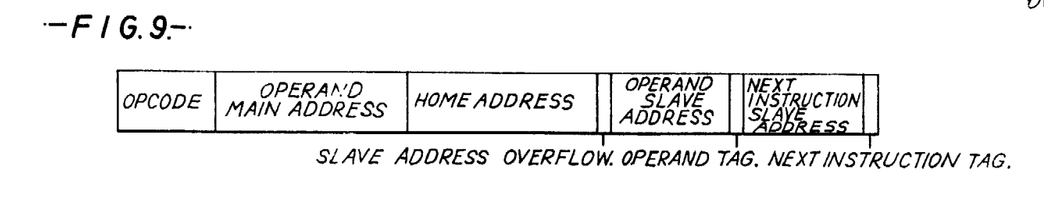

Referring to FIG. 7, the length of each word of the slave store may be reduced to 63 bits by eliminating the flag fields. This requires the following additional steps during the ENSLAVE procedure.

set operand tag not equal to enslave address overflow;

set next instruction tag not equal to enslave address overflow;

set operand slave address to discard address;—i.e., the address of the information itself— set next instruction slave address to discard address;

FIG. 8 shows the contents of a slave word immediately after completion of the thus modified enslave procedure. If the information is an instruction, at execution time it will attempt to link to itself both as the operand and as the next instruction. However, the attempt will fail because the tab bits are not equal to the slave address overflow bit. In other words, the conditions of the tag bits are the same as if both the operand and next instruction had been discarded. The required operand and next instruction are then enslaved or their existing slave addresses obtained as described above with reference to FIGS. 2 to 5. FIG. 9 shows the contents of the slave store location containing the current instruction after this has been done.

It has been found that when a system of the type shown in FIG. 7 is operating under ideal conditions (i.e. with accesses to the slave store only), the opcodes may be divided into six distinct types, assuming an I.B.M. 360 type instruction format, namely 1. No access to memory, e.g., register to register, literal
2. Memory to register, e.g., load, add
3. Register to memory, e.g., store
4. Conditional branch,
5. Unconditional branch, and
6. Operand at computed address, e.g., indexed.

To obtain maximum processing speed, the storage access controller C should be capable of distinguishing between these types. FIG. 7 shows the connection between the storage access controller C and the processor P to enable this to be done. The system programme flow is determined by the storage access controller depending on the type of opcode and the condition true/false bit.

In both embodiments of the invention, the need to check the validity of work address fields in the main store can be removed by adding an extra bit to each main store word. This bit is then used to indicate whether the location contains information or a work address.

In a modified embodiment of the invention, the slave address overflow bit field is omitted and its value deduced from the slave address of the required information (operand or next instruction) and the current slave address. If the slave address of the information is below the current discard address, then the slave address is valid if the corresponding tag bit is the same as the current discard address overflow bit. If the slave address of the information is above or equal to the current discard address, then the slave address is valid if the corresponding tag bit is different from the current discard address overflow bit. A subtract operation is required to determine whether the slave address of the information is above or below the current discard address.

In another embodiment of the invention, the tag fields and the slave address overflow field are all omitted. Positive or negative relative slave addresses, which do not exceed in magnitude the total number of words in the slave store, are used to indicate the locations in the slave store of the operand and next instruction. When calculating relative slave addresses, the slave store is treated as if its locations were arranged in a loop with the last location preceding the first location. Thus the displacement between the current discard address and the slave address of the current instruction may be expressed in either positive or negative form. When the relative slave address is calculated for insertion in one of the slave address fields of the instruction, it is calculated in such a way that it is less than the relative positive discard address and algebraically greater than or equal to the relative negative discard address. In subsequent operation, a relative slave address is valid if it is algebraically greater than or equal to the current relative negative discard address because only slave storage locations with negative relative slave addresses less than or equal to the current relative negative discard address will have been overwritten before the slave storage location containing such above addresses is itself overwritten.

The above-described subtraction and comparison operations are performed by the processor P.

Figure 10:
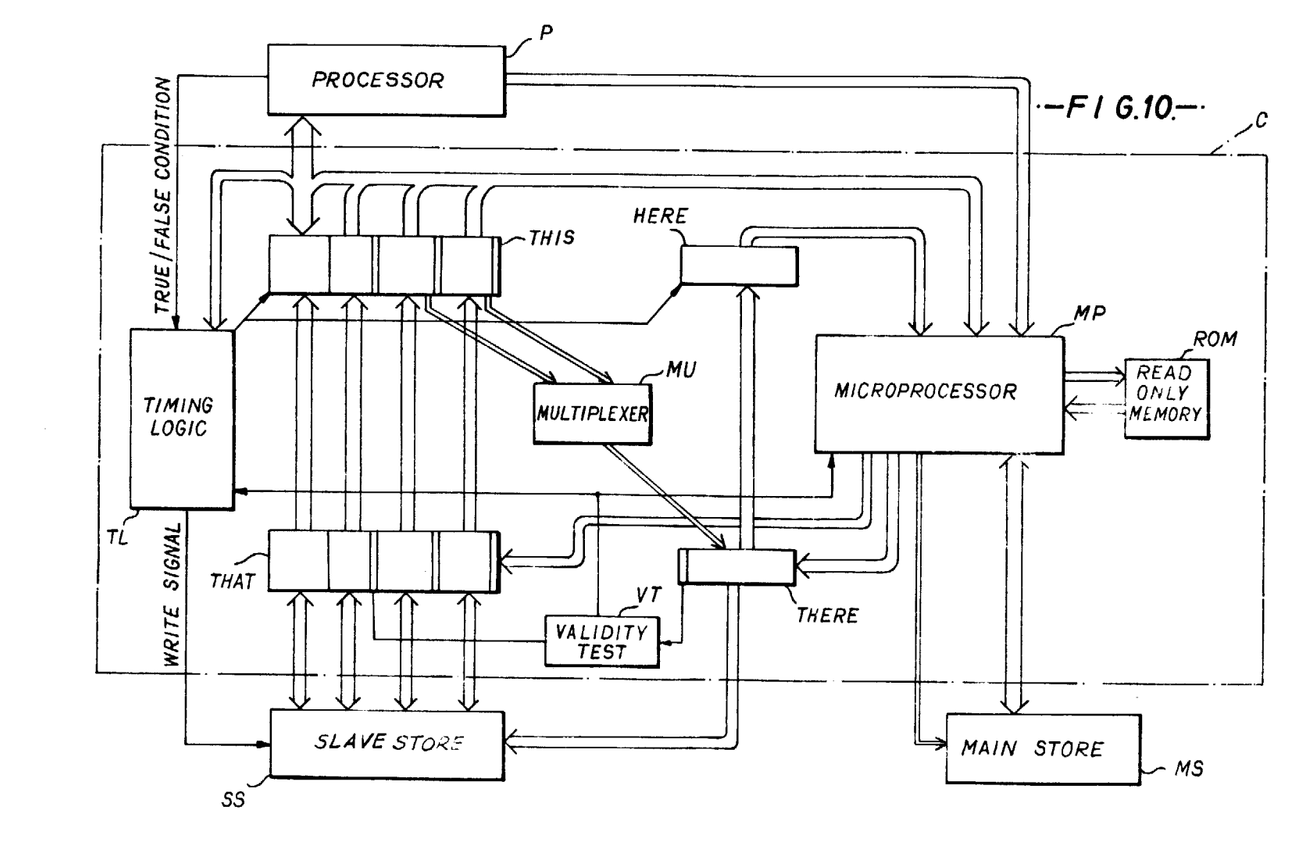
FIG. 10 is a block diagram illustrating a storage access controller for use with the system illustrated in FIG. 7.

Referring to FIG. 10, the storage access controller C of the system illustrated in FIG. 7 consists partly of special purpose hardware and partly of a microprocessor MP with its programme stored on a read-only memory ROM. The microprocessor MP includes a random access memory, part of which serves as the discard address register. The special purpose hardware is capable of performing all the operations necessary during "operation under ideal conditions" (as hereinbefore defined) when access to the main store MS is not required.

The special purpose hardware comprises:
- a current instruction slave address register HERE, which normally holds the slave address of the current instruction,
- a data slave address register THERE which normally holds the slave address of the current operand,
- a register THIS normally holding the slave word at the location held in the register HERE,
- a register THAT normally holding the slave word at the address in the register THERE,
- a multiplexer MU for applying either the operand slave address or the next instruction slave address of the word in the register THIS to the register THERE,
- a validity test unit VT for comparing the slave address overflow bit of the word in the register THAT with the tag bit of the address in the register THERE, and
- a timing logic unit TL.

The actions performed by the storage access controller when operating under ideal conditions depend on which of the above described six types of opcode is being carried out. The operation for each of the six types will now be described in respect of a cycle which begins with the slave location of the current instruction and the whole slave word containing the current instruction held in the registers HERE and THIS respectively. The cycle has two parts namely "execute current instruction" and "fetch next instruction". The type of instruction is identified by the timing logic until TL from the opcode portion of the word in the register THIS.

The part of the cycle "execute current instruction" is the more strongly affected by the type of instruction. For types 1 and 4 instructions, the timing logic unit TL immediately sends "information ready" signal to the processor P.

For a type 2 instruction, the operand slave address field of the current instruction, in the register THIS, is transferred via the multiplexer MU to the slave address register THERE, and the corresponding whole word from the slave store SS is read into the register THAT. The validity test unit VT is a comparator which tests the validity of the slave address in the slave address register THERE by comparing the tag bit thereof with the slave address overflow bit in the register THAT. If the output from the validity test unit VT indicates that the information is valid, the timing logic unit TL immediately sends an "information ready" signal to the processor P. If the test result is invalid, the microprocessor MP is triggered to perform appropriate operations described above to make the operand available in the slave store, after which a valid test result is obtained.

For a type 3 instruction, the "information ready" signal is immediately sent to the processor P so that the processor writes its result into the information field of the data slave word register THAT. Simultaneously the actions for a type 2 instruction are initiated in order to check the validity of the address in the operand slave address register THERE. When the processor P indicates, by means of a write control signal, that it has completed its operation and the validity test unit VT has indicated that the address in the register THERE is valid, the word in the register THAT is entered into the slave store SS at the address indicated by the register THERE.

For type 5 instructions, no action takes place during the "execute current instruction" part of the cycle, the system proceeding immediately "fetch next instruction".

For type 6 instructions, the link from the processor P to the microprocessor MP is activated, no other action taking place during "execute current instruction."

The second part of the cycle, "fetch next instruction" is closely analogous to the fetching of data in the execution of type 2 instructions. For types 1, 2, 3 and 6 instructions, the procedure is as follows. The address in the next instruction slave address field of the word in the register THIS is loaded via the multiplexer MU into the register THERE so that the slave word at the next instruction slave address is loaded into the register THAT and its validity checked by the validity test unit VT as previously described. As before, if the test shows that the address is invalid, the microprocessor MP is activated to obtain its next instruction from the main store MS as described above. When a valid result is obtained from the validity test unit VT, the next instruction word in the register THAT is transferred to the register THIS where it becomes the current instruction word. At the same time its slave address is transferred from the register THERE to the register HERE.

For type 5 instructions, the "fetch next instruction" part of the cycle is the same as for types 1, 2, 3 and 6 except that the "operand slave address" field is used to fetch the next instruction from the slave store SS.

For type 4 instructions, the next instruction cannot be fetched until an operation complete signal received by the timing logic TL from the processor P. Then the one bit "true/false" condition output from the processor P indicates whether the next instruction should be fetched as described for type 1, 2, 3 and 6 instructions (no jump condition) or for a type 5 instruction" (jump condition).

Initiation of the foregoing operations is effected by the timing logic unit TL which operates on the lines discussed in Sobel, "Introduction to Digital Computer Design" Addison Wesley, 1970, see particularly pages 175 to 177. At each step in the operating cycle, the timing logic performs either a Type I action, when it produces a clock pulse together with a one-bit signal indicating the action to be initiated, or a Type II action, when it pauses until receipt of a signal from the validity test unit VT before producing a clock pulse and a such one-bit signal. There are eleven such one-bit signals of which eight a to h relate to actions of the storage access controller C as follows:

a set THERE from operand field of THIS
  b set THERE from next instruction field of THIS
  c signal to MP to initiate read from MS
  d read THAT from SS address THERE and signal to MP to initiate enslavement if invalid
  e write result to THAT
  f signal to MP to initiate write to MS
  g write THAT to SS address THERE
  h transfer THERE to HERE and THAT to THIS The other three one-bit signals k, l and m which relate to action of the processor P, are as follows:

k read internal registers or direct data
  l compute arithmetical or logical function
  m write result to internal registors or data bus.

The operating cycle comprises seven steps of which steps 1 to 4 from the "execute current instruction" part of the cycle and steps 5, 6 and 7 from the "fetch next instruction" part of the cycle.

| Step | Type of action by TL | One-Bit signal, according to opcode Opcode | | | | | |
|---|---|---|---|---|---|---|---|
| | | 1 | 2 | 3 | 4 | 5 | 6 |
| 1 | I | K | a k | k | | | c |
| 2 | II | l | d 1 | l | l | | d 1 |
| 3 | I | m | m | e | | | m |
| 4 | I | | | g | | | f |
| 5 | I | k | k | k | * | a | k |
| 6 | II | d | d | d | d | d | d |
| 7 | I | h | h | h | h | h | h |

* Either a or k depending on true/false bit from the main processor P.

The microprocessor MP is a high-speed microprogrammable device capable of driving a data bus sufficiently wide to implement the connections shown and may comprise bit-slice components, such as the Intel 8000 or AMD 2900 series, assembled on the principles discussed in John B. Peatman "Microcomputer-based Design" McGraw Hill, 1977.

The processor P is a processor of the type in which the next address logic can be isolated and replaced by special purpose logic as described above. For example, it may be that part of an I.B.M. 360 or an interdata minicomputer which performs arithmetic and logical functions and which calculates the true/false condition associated with branch instructions.

A processor in accordance with the invention can be arranged to operate with three levels of storage, e.g. semi-conductor/core/drum. Thrashing across the two slower storage media can be eliminated even if a programme is maliciously written.

Appendix

The following is a description of the slave memory mechanism as an algorithm. The notation used is similar to that of the programming language PASCAL.
{The bits inmain and executing are not implemented by hardware}
{in fact they are eliminated at compile time}

| | | |
|---|---|---|
| TYPE integer | $=0..2^N-1$; | |
| address | $=0..2^M-1$; | |
| location | $=0..2^S-1$; | |
| dataorcode | =RECORD CASE executing : boolean OF | |
| | true: (opcode : $0..2^{(N-M)}-1$; | |
| | pointer : address); | |
| | false: (variable : integer) | |
| | END; | |
| word | =RECORD CASE inmain : boolean OF | Definitions |
| | true : (item : dataorcode); | of names |
| | false : (key : location) | used in |
| | END; | remainder of |
| level | $=0..2^{(S+1)}-1$; | program |
| bit | $=0..1$; | |
| cell | =RECORD item : dataorcode; | |
| | home : address; | |
| | tag : bit; | |
| | link : ARRAY[bit]OF level | |
| | END; | |
| VAR main | : ARRAY[address]OF word; | |
| slave | : ARRAY[location]OF cell; | |
| top | : level; | |
| this | : cell; {register for current instruction} | |
| here | : level; {of current instruction} | |
| that | : cell; {register for operand or next instruction} | |
| there | : level; {of operand or next instruction} | |
| ma | : address; {register for main memory address} | |
| jump | : boolean; | |
| index | : integer; | |

{All assignments to and from slave are with wraparound}
PROCEDURE — : bit);
VAR next : address;
  PROCEDURE enslave;
  BEGIN

| | | |
|---|---|---|
| there | :=top; | This procedure has |
| ma | :=slave[there].home; | been nested inside |
| main[ma].item | :=slave[there].item; | 'find'to eliminate |
| that.item | :=main[next].item; {'read for slave' | the specification |
| that.home | :=next;  signal} | of 'next' as a formal |
| that.tag | :=top DIV $2^S$; | parameter, but has |
| that.link[0] | :=top — $2^S$; }invalidate} | not otherwise been |
| that.link[1] | :=top —  $2^S$; {invalidate} | changed. |
| slave[there] | :=that; {'write to slave'signal} | Outer part of |
| main[next].key | :=top; {insert workaddress} | mechanism invoked |
| top | :=top +1 | by call of 'find' |
| | | from procedure |
| | | 'visit'. |

END;
BEGIN CASE b OF
  0 : next :=this.item.pointer;
  1 : next :=this.home + 1 END; {ESAC}
  there :=main[next].key;
  that :=slave[there]; {'read slave'signal}
  IF that.home $\neq$ next THEN enslave;
                slave[here].link[b]:=there
END;
PROCEDURE visit(b : bit);         Iner part of novel -continued

```
BEGIN there    := this.link[b];
      that     := slave[there]; {'read slave'signal}
      IF that.tag ≠ there DIV 2^S THEN find(b)
END;
PROCEDURE transfer (b : bit) ;

BEGIN visit(b) ;
      here := there;   {'Complete
      this := that      transfer'
                        signal}
END;
PROCEDURE obey;
BEGIN {CASE opcode OF
   1 : operands in that.item and register,
       result in register;
   2 : operands in that.item and register,
       result in that.item,
   5 : operands and result in registers;
   6 : operands in register and main[ma],
       result in register or main[ma] END ESAC}
```

⎫ aspect of store slaving
⎬ and instruction
⎭ implementation
  mechanism.
  Call of outer part
  of mechanism.

{This is a conventional
mechanism for performing
basic user functions and
delivering result to
appropriate destination.
In case 6, main[ma] must be
tested to see if it has
been enslaved and if so
to access operand from slave
memory or with a result to
write to slave memory or
invalidate slave memory and
write to main memory}.

```
PROCEDURE run;
{opcodes :— 1 = memory to register, 2 = register to
memory, 3 = unconditional branch, 4 = branch on true,
5 = register to register, 6 = indexed main address}
BEGIN CASE this.item.opcode OF
   1 : BEGIN visit(0);   {It may be more straightforward
           obey;          with hardware to copy back whole
           transfer(1)    word with the signal 'write to
           END;           slave'- possibly on condition
   2 : BEGIN visit(0);    that 'find' has been called}.
           obey;
           slave[there].item := that.item;
           slave[there].link 1 := there — 2^S; {invalidate}
           transfer(1)
           ENd;
   3 : transfer(0);
   4 : IF jump THEN trnsfer (0) ELSE transfer (1);
   5 : BEGIN obey;
           transfer(1)
           END;
   6 : BEGIN ma := this.item.pointer + index;
       {'computed address' signal sent}
           obey;
           transfer(1)
           END END; {ESAC}
    run {recurse while power on}
END;
PROCEDURE initialise;
BEGIN FOR there    := 0 TO (2^S – 1) DO
      slave[there].home := 0; {OD}
      slave[0].tag       := 0;
      this.item.opcode   := 3; {unconditional branch}
      this.item.pointer  := 1s; {some non-zero origin}
      this.link[0]       := 2 {invalidate}
      {may be implemented by writing to 'that' and
      activating 'complete transfer' signal}
END;
BEGIN initialise; {once only after power-up}
   run
END
END.
```

Conventional
mechanism for
accessing store
as indicated by
instruction class
and setting the
program counter
as indicated by
the 1 + 1 address
code.

Outer part of
mechanism invoked
on system
initialization.

I claim:
1. A computer system comprising:
(a) a central processing unit;
(b) a main store coupled to said central processing unit, said main store being provided for storing a plurality of data/instruction words at a plurality of addresses;
(c) a slave store coupled to said central processing unit and said main store, said slave store being of faster operating speed than said main store and being provided for storing a plurality of words at a plurality of addresses of lesser number than said main store addresses, each said slave store word including a main field for a respective data/instruction word transferred from said main store and a subsidiary field for at least one slave store address corresponding to the address of a further slave store word including a further data/instruction word transferred from said main store serving as a next instruction or operand associated with the first mentioned data/instruction word;
(d) a storage access controller linking said central processing unit, said main store and said slave store, said storage access controller enabling transfer of data/instruction words from the main store to an appropriate address in said slave store without involving said processing unit, enabling entry of the slave store address of the appropriate next instruction or operand into the subsidiary field of each said appropriate slave store address, and enabling discarding of previous words held in said slave store if necessary on a first-in-first-out basis;

(e) a discard address register within said storage access controller for storing the address in said slave store into which the next data/instruction word transferred from said main store is to be inserted by said storage access controller; and (f) validation means coupled to said slave store and said discard register, said validation means being provided for comparing the content of said subsidiary address field of the first mentioned data/instruction word with the content of said discard address register to determine whether said further data/instruction word at said slave store address has been overwritten by another data/information word from said main store since said slave store address was written into said subsidiary field.

2. A computer system according to claim 1, wherein the capacity of the discard address register is one bit greater than the number of bits of each slave store address, said subsidiary field includes a tag field of one bit and the storage access controller is arranged to copy the most significant bit of the discard address register into the associated tag field when a slave address is written into the subsidiary field of a word in the slave store, the validation means being arranged to compare said tag field with the value, stored at said slave address, of the most significant bit in the discard address register at the time when the information stored in the main field at the slave address recorded in said subsidiary field was entered at said slave address.

3. A computer system according to claim 2, wherein said subsidiary field includes a slave address overflow bit field adapted to store the most significant bit in the discard address register at the time when information is entered in the main field at said slave address.

4. A computer system according to claim 2, including means for resetting said tag field and setting the corresponding subsidiary field to its own slave address when information is written into the main field of said slave address.

5. A computer system according to claim 1, wherein said subsidiary field includes a flag field of one bit and the storage access controller includes means for setting said flag field when a slave address is written into said subsidiary field.

6. A computer system according to claim 1, wherein said subsidiary field includes two slave address fields, one for the slave address of an operand and the other for the slave address of the next instruction.

7. A computer system according to claim 1, wherein the storage access controller incorporates a current instruction slave address register for storing the slave store address of a current instruction word and a current operand slave address register for storing the slave store address of a current operand.

8. A method of accessing information in a computer system having two levels of memory, one level comprising a main store and the other level comprising a slave store of faster operating speed than said main store and having a lesser number of addresses than said main store, each word in said slave store including a main field of the same size as a word of main store and a subsidiary field capable of containing at least one slave store address, there being provided (i) a storage access controller coupled to said main store and said slave store and including a discard address register for storing the address in said slave store into which the next transfer from said main store is to be inserted by said storage access controller, and (ii) validation means coupled to said slave store and said discard address register, the method comprising:

(a) transferring each of a plurality of words from a respective address in said main store to said main field of a respective address in said slave store determined by the discard address register under the control of said storage access controller, at least one of said words being an instruction and at least another of said words being data, previous words held in said slave store being discarded if necessary on a first-in-first-out basis;

(b) entering the slave store address of data required by said instruction into the subsidiary field of the slave store address of said instruction under the control of said storage access controller; and (c), prior to execution of said instruction, comparing, in said validation means, the content of the subsidiary field of the slave store address of said instruction with the content of said discard address register to determine whether said data required by said instruction has been overwritten by another word from said main store since the slave store address of said data was written into the subsidiary field of the slave store address of said instruction.

9. A method according to claim 8, wherein the capacity of the discard address register is one bit greater than the number of bits of each slave store address and said subsidiary field includes a tag field of one bit, the method incorporating the steps of copying the most significant bit of the discard address register into the associated tag field when a slave address is written into the slave address field of a word in THE slave store, and comparing, in said validation means, said tag field with the value of the most significant bit in the discard address register at the time when the information stored in the main field at the slave address recorded in said subsidiary field was entered at said slave address.

10. A method according to claim 9, further comprising storing, in a slave address overflow bit field, the most significant bit in the discard address register at the time when information is entered in the main field at said slave address.

11. A method according to claim 9, further comprising resetting said tag field and setting the corresponding subsidiary field to its own slave address when information is written into the main field of said slave address.

12. A method according to claim 8, wherein said subsidiary field includes a flag field of one bit, the method incorporating setting said flag field when a slave address is written into the corresponding subsidiary field under the control of the storage access controller.

13. A method according to claim 8, wherein the discard address register is incremented by one each time a word is transferred from the main store to the slave store.

* * * * *